ically isolated from each other and
United States Patent
Tulumello

[11] 3,847,810
[45] Nov. 12, 1974

[54] APPARATUS FOR SEPARATING OIL FROM WATER AND MEASURING THE AMOUNT OF OIL SO SEPARATED

[76] Inventor: Angelo C. Tulumello, 18508 Lorrence Ave., Apt. 2E, Lansing, Ill. 60438

[22] Filed: May 4, 1973

[21] Appl. No.: 357,506

[52] U.S. Cl.............. 210/96, 210/391, 210/398, 210/DIG. 21
[51] Int. Cl............................................ E02b 15/04
[58] Field of Search............ 210/96, 360, 391, 398, 210/DIG. 21

[56] References Cited
UNITED STATES PATENTS

| | | | |
|---|---|---|---|
| 2,750,107 | 6/1956 | More........................... | 210/360 R X |
| 2,701,643 | 2/1955 | Spencer...................... | 210/360 R |
| 3,578,583 | 5/1971 | Yahnke........................ | 210/DIG. 21 |
| 3,189,268 | 6/1965 | Nilsson........................ | 210/96 X |
| 3,743,095 | 7/1973 | Mensing et al............. | 210/96 X |

Primary Examiner—John Adee
Attorney, Agent, or Firm—John J. Connors

[57] ABSTRACT

Trace amounts of oil in a stream of water are separated from this stream by an apparatus including a motor having a drive shaft and a rotor connected to the end of this drive shaft. This rotor is contained within a housing having an inlet for introducing the stream of oily water into the housing and an outlet for removing purified water. The rotor has two spaced metal plates electrically isolated from each other and absorber material such as polyurethane foam between the plates. As the rotor turns, oil is collected near the center of the rotor in the absorber material. The two plates of the rotor are connected in an electrical circuit for measuring capacitance between the plates. As oil is absorbed by the foam, the capacitance changes. This capacitance measurement is a function of the amount of oil collected from a water stream. Thus, the amount of oil in the stream is measured by measuring capacitance.

12 Claims, 8 Drawing Figures

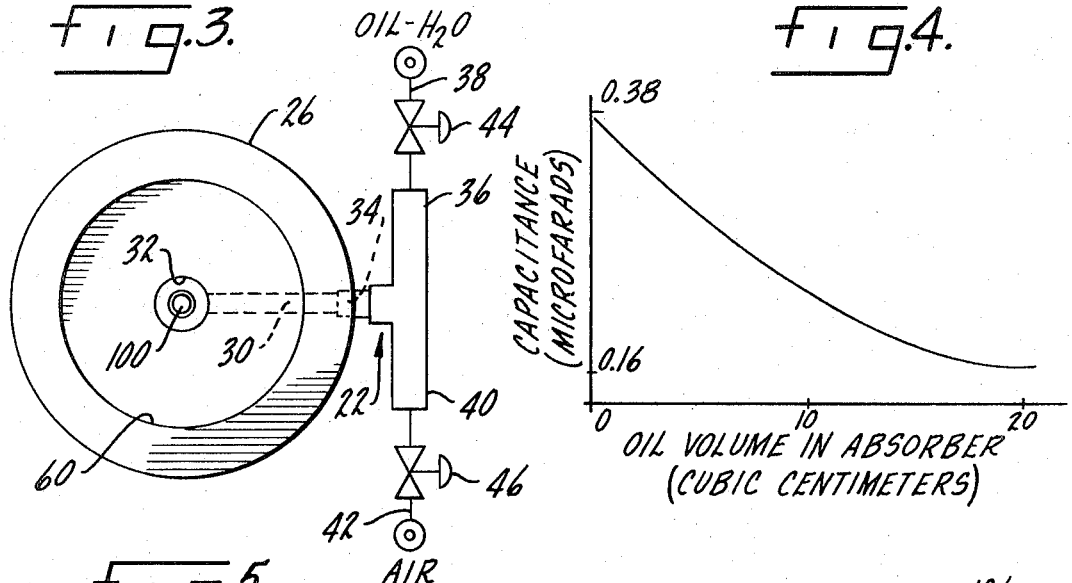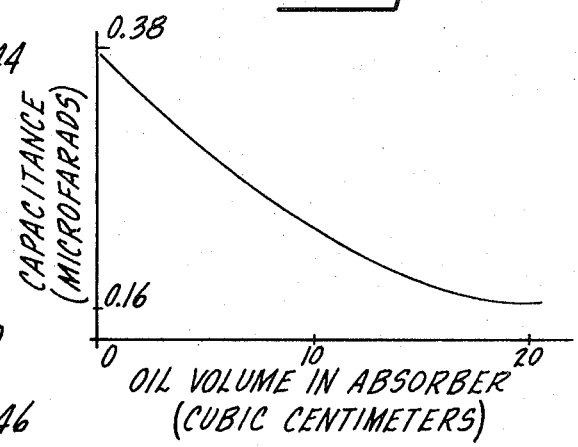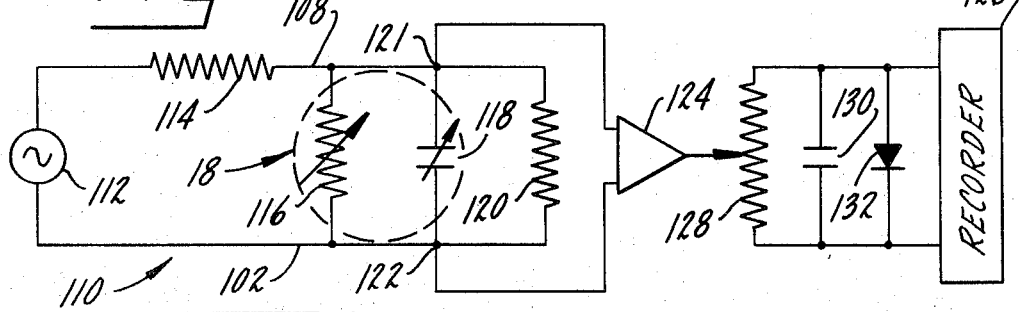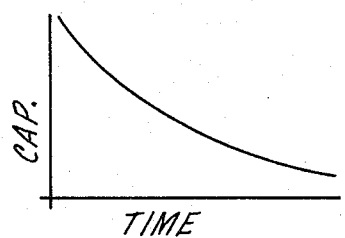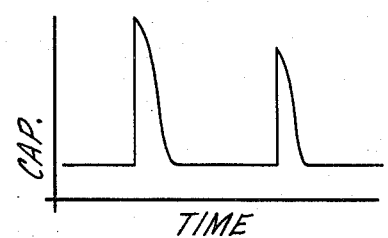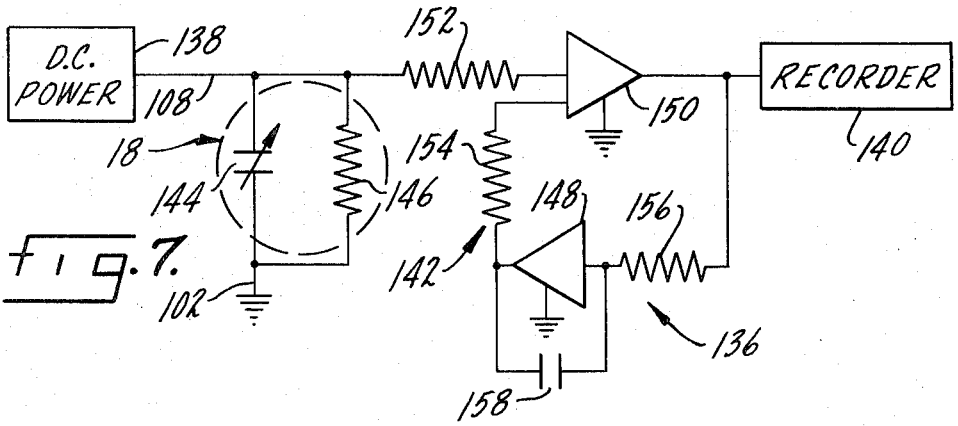

3,847,810

APPARATUS FOR SEPARATING OIL FROM WATER AND MEASURING THE AMOUNT OF OIL SO SEPARATED

BACKGROUND

It is common practice to fill marine oil tankers with ballast water after their oil cargo has been unloaded. This ballast water contains trace amounts of oil and is a source of water pollution if untreated and discharged directly into a receiving body of water. Another source of water pollution is oil refinery waste water. This water, in addition to other contaminants, usually contains trace amounts of oil. Oil is frequently present in emulsified forms and is very difficult to separate from the water. Proposed federal and state standards would only permit the discharge of water containing no more than about 100 parts of oil per million parts of water. Frequently, those discharging water into lakes and streams are called upon to prove that the discharged water meet federal and state standards. At present there is no simple, reliable apparatus for separating trace amounts of oil from water, measuring the oil content of water discharged into receiving bodies of water, and providing a record of the measurement.

THE INVENTION

I have now invented a simple and reliable apparatus for separating trace amounts of oil from water and measuring the amount of oil in the water. My apparatus comprises a rotor including an absorber material which selectively absorbs oil. The rotor is mounted on a drive shaft of a motor, and it is contained in a housing. There is an inlet in the housing for introducing an oil and water mixture into the housing, and an outlet in the housing near the periphery of the rotor for removing separated water from the housing. The drive shaft is turned by a motor to thus establish in the housing a centrifugal force-field. This field separates the oil from water pulling the oil to the center of the rotor and pushing separated water to the periphery of the rotor and out the outlet. The preferred absorber material is polyurethane foam. The oil can be removed from the rotor by introducing air into the rotor. The rotor also includes a pair of spaced plates secured to the drive shaft with the absorber material between them. These plates are conductive, electrically isolated from each other, and connected in a capacitance measuring circuit. The plates and absorber material are a variable capacitor whose capacitance changes as a function of oil collected by the absorber material. This capacitance is a measure of oil in water.

DESCRIPTION OF DRAWINGS

FIG. 3 is a cross-sectional view taken along line 3—3 of FIG. 2.

FIG. 4 is a graph made during calibration of the apparatus shown in FIGS. 1 through 3.

FIG. 5 is a capacitance measuring circuit of the integrating type.

FIG. 6 is a chart made by the recorder shown in FIG. 5.

FIG. 7 is a capacitance measuring circuit of the differentiating type.

FIG. 8 is a chart made by the recorder shown in FIG. 7.

DESCRIPTION OF PREFERRED EMBODIMENTS

Figure 1:
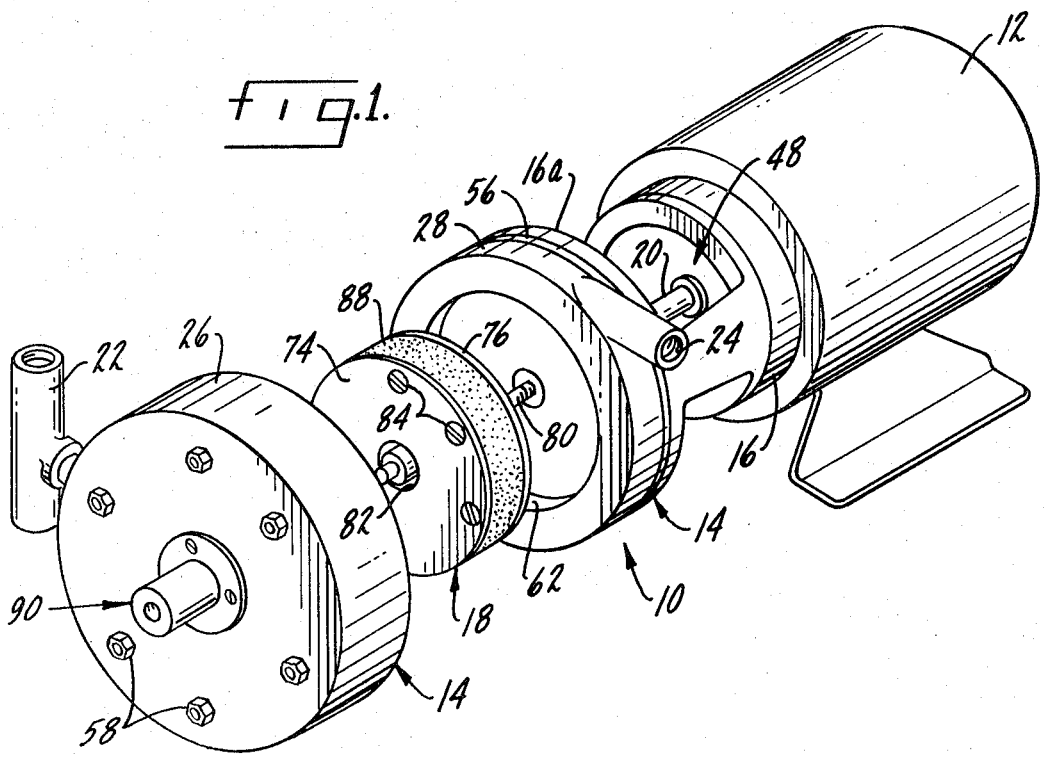
FIG. 1 is an exploded perspective view of my apparatus.
Figure 2:
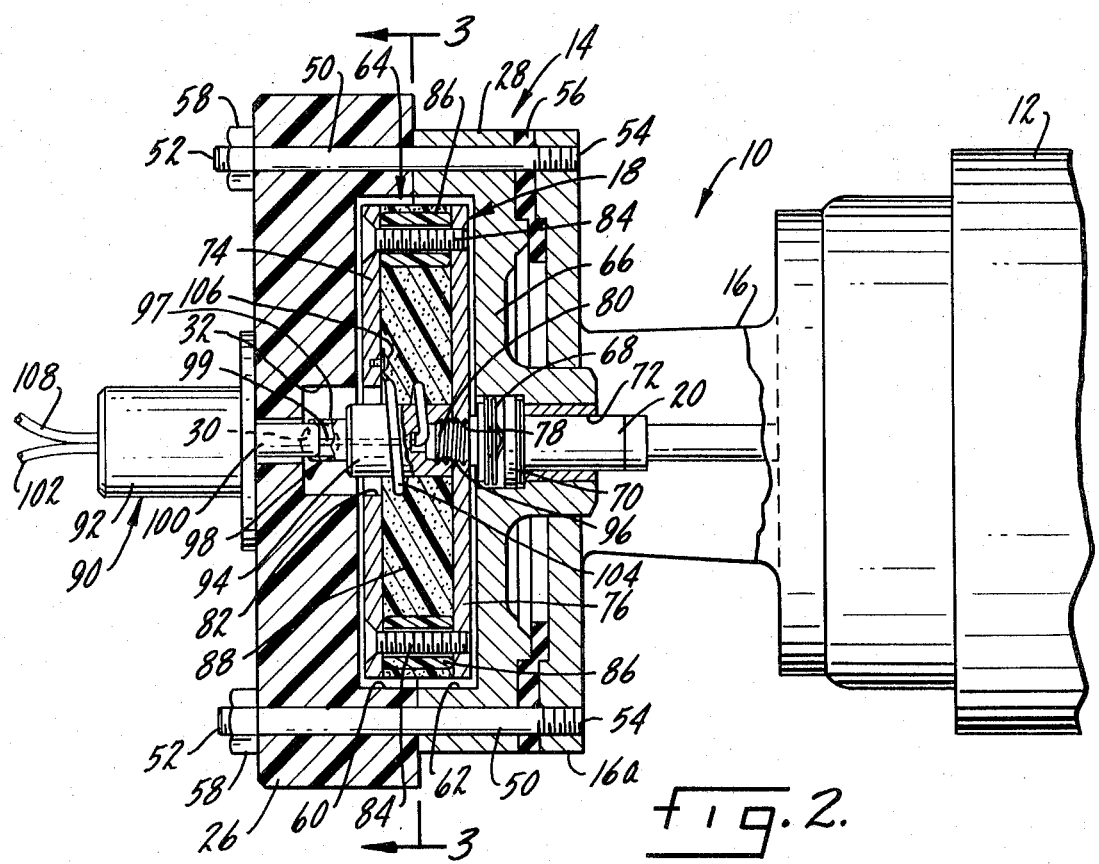
FIG. 2 is a cross-sectional view of my apparatus.

FIGS. 1 through 3 show the oil-water separating apparatus 10 of my invention. This apparatus 10 has a motor 12, a rotor housing 14 attached by bracket 16 to the motor, and a rotor 18. This rotor 18 is contained in the housing 14 and mounted to the drive shaft 20 of the motor 12. An oil-water mixture is introduced into the housing 14 through a T-shaped inlet 22, and oil and water are separated by a centrifugal forcefield established by the rotor 18. Separated water flows from the rotor housing 14 through an outlet 24 near the periphery of the rotor.

As shown in FIG. 2, the rotor housing 14 is partitioned into two circular sections 26 and 28. One section 26 is made of an insulating material, for example, polystyrene or polyethylene. The other section 28 is made of metal and has the outlet 24 extending from its periphery. As best shown in FIG. 3, there is within the plastic section 26 a channel 30 extending radially from a central cavity 32 in this section. The inlet 22 is attached to the peripheral end 34 of this channel 30. One branch 36 of this T-shaped inlet 22 is connected to the oil-water stream through a valved line 38. The other branch 40 of the inlet 22 is connected to air through a valved line 42. Selectively opening and closing the valves 44 and 46 in these lines 38 and 42 introduces either an oil and water mixture or air into the rotor housing 14. Optionally, a three-way electrically operated valve could be used instead of the T-shaped inlet 22.

The bracket 16 supports the rotor housing 14 and has an open center 48 which permits the drive shaft 20 of the motor 12 to pass through it into the rotor housing 14. Studs 50 having opposed threaded ends 52 and 54 extend from the bracket 16. These studs 50 are made of plastic so that they are insulators. There are openings in the two sections 26 and 28 aligned with the studs 50, permitting the studs to pass through these sections. The metal section 28 abuts an insulator ring 56 of polyvinylchloride and is disposed between the bracket flange 16a and the metal section 28. The plastic section 26 abuts the metal section 28 and nuts 58 secure to the ends 52 of the studs 50 draw the two sections of the housing 14 snugly together, securing them to the bracket flange 16a.

There are circular bores 60 and 62, respectively, in the inner surface of each of the housing sections 26 and 28. Thus, when the two sections 26 and 28 of the housing 14 are joined together there forms within the housing a cylindrical chamber 64. The drive shaft 20 of the motor 12 extends through the back wall 66 of the metal section 28 into the center of this chamber 64. A spring 68 holds a washer 70 snug against the opening 72 in section 28 which receives the drive shaft 20. This washer 70 seals the opening 72 so liquid cannot escape at this point. Other suitable seals are also available.

Within the chamber 64 and mounted to revolve as the drive shaft 20 turns is the rotor 18. This rotor 18 includes two spaced apart circular metal plates 74 and 76. At the center of one plate 76 is a threaded opening 78 enabling this plate to be screwed to the threaded end 80 of the drive shaft 20, securely mounting this plate 76 to the drive shaft. The other plate 74 has an enlarged opening 82 at its center and a plurality of screws 84 passing through the periphery of this plate into the periphery of the other plate 76. These screws 84 are made of nylon so they insulate one plate from the other. Spacers 86 made of polyvinylchloride are disposed between the two plates. These spacers 86 are hollow cylinders which permit the screws to pass through them. Between these parallel plates 74 and 76 is an absorber 88 which selectively absorbs oil introduced into the chamber 64. Preferably the absorber 88 is polyurethane foam, although any suitable material which selectively absorbs oil could be used. As the drive shaft 20 of the motor 12 turns, the two plates 74 and 76 revolve as a unitary structure holding the absorber 88 in place between them. Oil is collected near the center of the chamber 64 at the drive shaft, and water is collected near the periphery of the chamber. This purified water flows from the outlet 26 as the rotor turns.

In accordance with an important feature of my invention, the plates 74 and 76 serve as a capacitor whose capacitance changes as oil is collected in the absorber material. A rotating electrical connector 90, such as the Mercotac connector, made by Leslie Manufacturing Company, is used to connect the capacitor in circuit. This connector 90 has two separate components: a stationary head 92 and revolving contact 94. The stationary head 92 passes into the plastic section 26 of the housing 14 and is secured to this section. The revolving contact 94 is secured at its internally threaded end 96 to the threaded end 80 of the drive shaft 20. The contact 94 passes through the enlarged opening 82 in the plate 74 and is thus electrically isolated from this plate 74. This contact 94 has a hollow receptacle section 98 including a wall 97 and a pin 99 which is in electrical contact with a receiver (not shown) in the stationary head. The pin 99, however, is spaced from the wall and thus electrically isolated. The contact 94 revolves around this pin 99 or point connection as the drive shaft revolves. A line 102 leading from the head 92 is connected to plate 74 through the pin 99 and a looped wire 104 fastened by a screw 106 to the plate. A line 108 also leading from the head 92 is connected to plate 76 through the plug 100 and receptacle section 98. These lines 102 and 108 connect the plates 74 and 76 in the measuring circuits shown in FIGS. 5 or 7.

FIG. 4 is a graph which illustrates how my apparatus is calibrated. As previously stated, the capacitance between the plates 74 and 76 changes as oil is collected in the absorber 88. This change in capacitance will be different for each individual apparatus, depending upon the geometric configuration of the plates 74 and 76 and the distance between the plates. Consequently, my apparatus 10 is first calibrated by introducing known quantities of oil into a stream of fluid flowing into the chamber 64. For example, the apparatus 10 shown in FIGS. 1 and 3 has plates of a diameter approximately 3½ inches and a thickness of about one-fourth inch, spaced apart approximately three-fourth inch, and having polyurethane foam disposed therebetween. Capacitance was measured at approximately 0.38 microfarads when oil free water flows through the apparatus 10. FIG. 4 illustrates the decrease in capacitance as increasing amounts of oil were introduced into the stream and collected in the polyurethane foam. For example, when approximately 22 cubic centimeters of oil was collected by the foam, the capacitance was reduced to about 0.18 microfarads. When my apparatus 10 has been so calibrated, it can now be used to detect, separate and measure the amount of oil present in a stream of water.

FIG. 5 illustrates an electric circuit 110 used to measure, as a function of capacitance, the amount of oil present in a stream of fluid. This circuit 110 is of the integrating type, and it includes an AC source 112 having one side connected through a relatively large resistance 114 (400 ohm) to one plate 76 of the rotor 18. The other side of this source 112 is connected to the other plate 74 of the rotor 18. The rotor 18 has a resistance between the plates 74 and 76 represented in the circuit 110 by a variable resistance 116 and a capacitance represented by a variable capacitance 118. A load resistor 120, having a small resistance in comparison to the resistance of the variable resistor 116, is in parallel connection with this resistor 116, and capacitor 118. For example, in the apparatus 10 illustrated, the rotor 18 has a resistance of about 20 ohms and the load resistor has a resistance of about 5 ohms. The high resistor 114 insures constant current at points 121 and 122 and the load resistor 120 insures that only changes in capacitance will change impedance across the variable capacitor. Sometimes the salinity of water flowing through the rotor may change. This would change the resistance of the rotor, however, such changes will not cause a change in impedance of the rotor 18 because most current flow is through resistor 120. Thus, only changes in capacitance of the rotor affect the signal across the capacitor 118. Where there is a change in impedance, it is due to capacitance change which is detected by an amplifier 124. The output of the amplifier is connected to a recorder 126 through a circuit including a parallel connected variable resistor 128, a capacitor 130, and a diode 132. As the impedance across the variable capacitor 118 changes with collection of oil in the absorber 88, the output of the amplifier 124 changes. The chart from the recorder is illustrated in FIG. 6. This chart illustrates that over a given period of time, as oil is collected in the absorber 88, capacitance gradually decreases.

The frequency of the AC power source 112 is determined by the geometry of the rotor 18 and is tuned to the measuring circuit 110. The impedance of this circuit 110 is affected by the frequency of the AC signal, and if this frequency is not in the proper range, changes in impedance across the capacitor 118 will not be detected. The proper frequency will have to be determined depending upon the geometry of the rotor 18. In the apparatus illustrated, the typical AC frequency is one megacycle per second.

If desired, the load resistor could be switched out of the circuit 110. Then the circuit would measure both capacitance and resistance of the rotor 18.

Such integrated type measurement of capacitance could be used where oil contaminated water is held in a retaining basin before it is fed into a receiving body of water. Assume the water includes trace amounts of oil. For example, if it contains less than 100 parts per million of oil, it meets state and federal water purity standards and can be fed into the receiving water. Using my apparatus 10 to monitor the stream of water flowing into the retention basin, one could determine whether or not this water met the federal and state standards. For example, calibration of the apparatus 10 indicates a capacitance of 0.18 microfarads equals approximately 20 cubic centimeters of oil absorbed and collected. At a flow rate of one liter per minute it would take about three hours for such an amount to accumulate in the absorber 88. This would be equivalent to less than about 100 parts per million and indicate that the water sent to the retention basin did meet federal and state requirements and could be safely fed into a receiving stream. If 20 cubic centimeters of oil was collected before this time elapsed, this would be an indication that the water did not meet specifications and could not be dumped into a receiving body of water. Recorder chart shown in FIG. 6 provides a permanent record of the monitoring and serves as evidence that the water fed to the receiving stream did meet state and federal standards.

FIG. 7 shows an alternate type of capacitance measuring circuit 136. This circuit 136 is of the differentiating type. It includes a DC power source 138 having its output connected to ground through the rotor 18 and to a recorder 140 connected through an amplifier-comparator circuit 142. In this circuit embodiment the rotor 18 has a variable capacitance represented by the variable capacitance 144 and a resistance represented by resistance 146. This circuit 136 assumes that the resistance across the rotor 18 remains constant, for example, if pure, non-saline water was being monitored. Then the only variable in the system would be the capacitance of the capacitor 144. The amplifier-comparator circuit 142 includes two amplifiers 148 and 150. One amplifier 150 has one input connected through a resistor 152 to the DC power source 138 and another input connected through a resistor 154 to the output of the other amplifier 148. The output of the amplifier 150 is connected to the input of the second amplifier 148 through a resistor 156. Capacitance feedback is provided by compacitor 158 which connects the output of amplifier 148 to its input. The output signal of the amplifier 150 feeding back through the second amplifier 148 remains constant provided there is no change in capacity of the rotor 18. Whenever there is a change in capacitance, a peak signal is transmitted to the recorder 140. This signal is a function of the time constant of the RC circuit including the capacitor 158 and resistor 156. FIG. 8 shows the chart of the recorder 140. The various peaks indicate a change in capacitance which occurs when oil is collected in the absorber 88. The peak height is an indication of the amount of oil collected. When absorber 88 is saturated, the output of amplifier 150 will be steady.

This circuit 136 is used to detect for the presence or absence of oil, or a rapid increase or decrease in the quantity of oil in a stream of water. As long as the stream being monitored remains free of oil, the capacitance of the rotor 18 remains constant. If a slug of oil is introduced into the stream, this oil will be collected by the absorber 88 to change the capacitance of the rotor 18. Circuit 136 then provides a peak signal output. Such a signal could be used to immediately shut off flow of the water stream, for example, by actuating a relay which closes a control valve.

In operation, the valve 44 in the oil-water line 38 is open to permit an oil-water mixture to flow through the inlet 22 and channel 30 into the rotor chamber 64 near the drive shaft 20 of the motor 12. The turning rotor 18 establishes a centrifugal force field within the chamber 64. Heavier fluids such as water move in this field toward the periphery of the rotor 18 and flow from outlet 24. The light fluid such as oil collects near the center of the rotor 18. The polyurethane foam absorber 88 serves to coalesce emulsified oil and hold it within the porous structure of the foam. The capacitance of the rotor 18 changes as oil collects in the foam. Changes in capacitance are measured by either circuit 110 or 136 and recorded on the chart paper of the recorders 126 and 140 in these respective circuits.

When the absorber 88 has been saturated with oil, the valve 44 in line 38 is closed, and the valve 46 in line 42 is opened. Air enters through the inlet 22 and channel 30 into the chamber 64. This air forces the oil from the absorber 88 and the oil flows from the outlet 24. The motor 12 is stopped, the air valve 46 is closed, and oil-water mixture is again permitted to fill the chamber 64 to displace the air. The motor 12 is started up and the separation cycle is repeated until the absorber 88 is once again saturated with oil.

An alternate way of removing oil from the absorber 88 while permitting the rotor 18 to continuously rotate would be through means of a hollow motor drive shaft having its remote end connected to a vacuum source through a valve. Periodically the valve would be opened. The vacuum would then withdraw oil from the absorber through the hollow shaft to storage. This cyclic operation may be preferable in some instances.

The advantages of my apparatus 10 are that it is simple to operate and serves the dual function of both separating oil from a stream of water and measuring the quantity of oil present in the stream. My apparatus could be made on a small scale and used principally as a monitoring device, or it could be used as a large centrifugal pump to pump water and simultaneously collect and measure trace amounts of oil present in the water. Such pumps could be used for pumping ballast water from oil tankers or for forwarding waste water from oil refineries to water purification plants. Such apparatus would also be useful in metal cutting operations where cooling water and cutting oil are mixed and emulsified. This cooling water must be purified before discharged to sewage or treating plants.

Modification can be made in the apparatus shown without departing from the principles of this invention as defined in the following claims.

I claim:

1. Apparatus for separating oil and water comprising a chamber,
   rotor means in the chamber including an absorber means which selectively absorbs oil, in conductive means,
   inlet means in said chamber means for introducing oil-water mixture into the said chamber,
   outlet means in said chamber near the periphery of the rotor means for removing separated water from the chamber, and
   means for revolving said rotor means to establish a centrifugal force-field in said chamber which separates the oil from water, pulling the oil to the center of the rotor means and pushing separated water to the periphery of the rotor means and out the outlet means, and
   circuit means coupled to the conductive means in said rotor means, said circuit means measuring capacitance across said conductive means.

2. The apparatus of claim 1 where the rotor means includes a pair of spaced plates having the absorber disposed between said plates, said pair of plates being conductive, electrically isolated from each other, and connected in said capacitance measuring circuit means.

3. The apparatus of claim 2 where the capacitance measuring circuit means includes means which integrates capacitance measurement as oil is collected in the absorber means.

4. The apparatus of claim 2 where the capacitance measuring circuit means includes means which differentiates capacitance measurement as oil is collected in the absorber means.

5. The apparatus of claim 2 where the absorber means comprises polyurethane foam.

6. The appartus of claim 1 including means for introducing air into the chamber to purge the absorber means of oil.

7. The appartus of claim 1 including means for periodically removing oil collected in the absorber means.

8. Apparatus comprising
a rotor including a pair of spaced metal plates electrically isolated from each other, and a porous absorber material between said plates,
a chamber adapted to house the rotor, said chamber having an inlet for introducing into the chamber a mixture of heavy and light fluids, and an outlet near the periphery of the chamber for removing heavy fluid collected at the periphery of the rotor,
a motor including a drive shaft extending into the center of the chamber, said rotor being secured at its center to said drive shaft, and
a measuring circuit including a power source, and electrical coupling means for connecting the plates in said circuit so that said plates act as a variable capacitor whose capacitance changes as fluid collects in the absorber material, and capacitance measuring means including recorder means for providing a record of capacitance measurement.

9. The apparatus of claim 8 where the capacitance measuring circuit includes means which integrates capacitance measurement as oil is collected in the absorber means.

10. The apparatus of claim 8 where the capacitance measuring circuit includes means which differentiates capacitance measurement as oil is collected in the absorber means.

11. The apparatus of claim 8 where the inlet includes a valve means for selectively discontinuing flow of fluid into the chamber.

12. The apparatus of claim 8 where the heavy fluid is collected near the center of the chamber and the drive shaft is hollow having its remote end connected to a vacuum for withdrawing the heavy fluid from the chamber through the hollow drive shaft.

* * * * *